United States Patent

Nemec et al.

[11] Patent Number: 4,665,891
[45] Date of Patent: May 19, 1987

[54] COUNTRY COOKER COOKING SYSTEM

[76] Inventors: Garrett P. Nemec, 14234 Galvani, Cypress, Tex. 77429; David J. Gray, 7106 Goldendale, Cypress, Tex. 77433

[21] Appl. No.: 875,925

[22] Filed: Jun. 19, 1986

[51] Int. Cl.⁴ .......................... A47J 37/00; F24B 3/00
[52] U.S. Cl. .......................... 126/25 R; 126/273 R; 99/447
[58] Field of Search .............. 126/25 R, 25 A, 9 R, 126/9 A, 9 B, 11, 29, 276, 30, 275 R, 273 R; 99/339, 340, 447

[56] References Cited

U.S. PATENT DOCUMENTS

| | | | |
|---|---|---|---|
| 858,872 | 7/1907 | Kimmel | 126/25 R |
| 860,466 | 7/1907 | Hatcher et al. | 126/25 R |
| 2,597,477 | 5/1952 | Haislip | 126/9 B |
| 2,867,208 | 1/1959 | True et al. | 126/25 R |
| 3,477,360 | 11/1969 | Raney | 126/25 R |
| 4,076,008 | 2/1978 | Deaton | 126/25 R |

Primary Examiner—James C. Yeung
Attorney, Agent, or Firm—Richard C. Litman

[57] ABSTRACT

A country cooker system including a combination brazier, barbecue, grilling and smoking arrangement comprising a cylindrical hollow body defining a cylindrical chamber stably supported by a set of four detachable legs having upper ends thereof interfitting engaging with let insert members, the cylindrical chamber defining a smoke or cooking chamber in which horizontally disposed about a lower portion therein is a grill or cooking support surface, means providing access to the chamber through a hingedly disposed smoke chamber door supported by a set of hinges along an upper element of the door, a short pipe-shaped smoke stack supportably disposed to and communicating directly with the chamber at its lower end by a circular insert member to the cylindrical chamber, a member connecting an adjustable exhaust and flue cover supportably disposed and connected at an upper end of the stack, a detachable hollow fire box mounted about the other end of the chamber and communicating directly therewith along a lower and mediate surface by a set of carriage bolts, a forward surface of the fire box having fire box door supported by hinges along a vertical corner edge, adjustably controlled draft holes mounted in the door of the fire box, and a recessed braiser grate mounted on an upper surface of the fire box over which is hingedly disposedly mounted by hinges a fire box cover along a horizontal corner edge.

2 Claims, 1 Drawing Figure

COUNTRY COOKER COOKING SYSTEM

BACKGROUND OF THE INVENTION

1. Field of the Invention

The invention relates to an improved combination smoker, and brazier cooking system having the capability of being user assembled, and more particularly the invention is directed to a user assembled country cooker cooking system or structures having a side mounted fire box, wood shelf and stack located about the exterior of the barbecue and the smoker functioning space.

The invention relates further to a device providing for the concept of user assembled country cooking cooker system uniquely constructed of a various number of cooperating combining features thereof as more particularly described herein.

Food to be cooked is placed on a rack inside the chamber. It may then be cooked by means of a direct heat source directly under the food, or indirectly by using the separate fire box as a source of heat for slower cooking with lower temperatures. The top cover of the fire box opens to expose a recessed expanded metal cooking or brazing surface if the user desires a smaller more economical direct heat source for smaller portion requirements.

2. Description of the Prior Art

Various prior art combination smoker, barbecue and brazier cooking combinations, and the like, as well as apparatus and method of their construction in general, are found to be known and exemplary of the U.S. prior art are the following:

| | |
|---|---|
| 323,665 | Gordon |
| 1,284,498 | Vidmar |
| 2,838,991 | Kleinmann et al |
| 2,851,941 | Cogar |
| 3,472,151 | Cox |
| 3,683,791 | Rast |
| 3,809,051 | Giroux |
| 4,183,291 | Portman |

These patents or known prior uses teach and disclose various types of cooking devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide a novel cooking apparatus or device that is user assembled and is a novel combination of popular outdoor cooking means and methods.

Another object of the invention is directed further to a device providing for the use of a unique design in that its major components may be user assembled, and also enable the complete system to be easily packaged in a dismantled state, thus qualifying for a Class 75 or lower common carrier freight rate.

Another object of the invention is to provide a novel and improved "knock-down" construction that will reduce the retail storage space to a cube 26×26×38 inches (about 256 cm×256 cm×374 cm), making it possible for the retailer to allocate full floor space to only a display model. Also the system makes available to the general public a system for smoker style cookery, as well as conventional barbecue grilling, brazing and roasting in a package, that because of its take-down construction makes it feasible to mass market and mass produce.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

The FIGURE is a perspective view of a country cooker cooking system according to a preferred embodiment and best mode of the present invention.

DESCRIPTION OF A PREFERRED EMBODIMENT OF THE INVENTION

Figure 1:
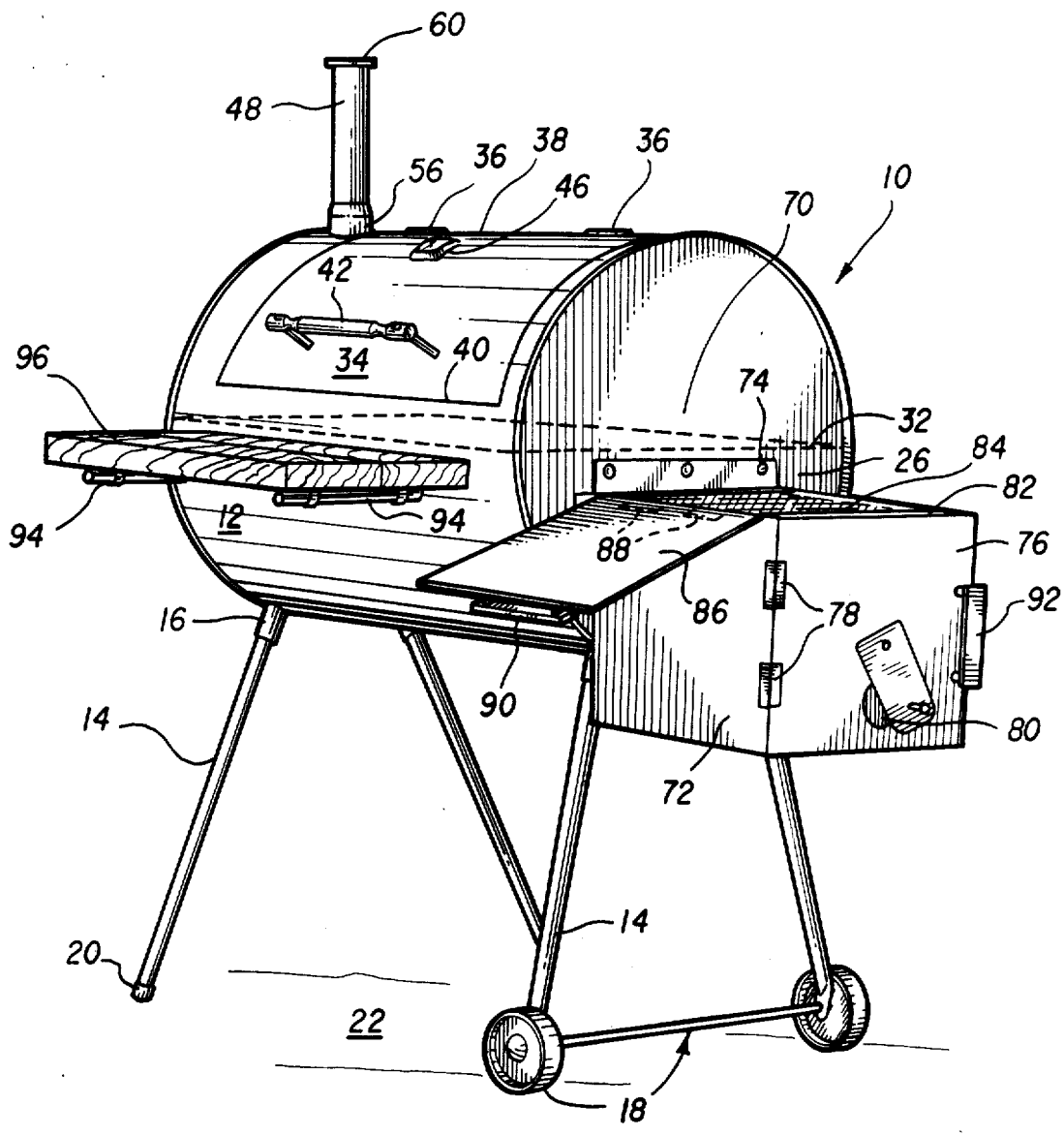

Referring now to the drawings there is shown in the FIGURE a country cooker cooking system 10 having a combination grilling and smoking cylindrical hollow body or cooking chamber 12 constructed throughout of a 16 gauge cold rolled steel or similar metal, and the chamber 12 is stably supported by a set of four detachable extensions or legs 14 having upper ends thereof interfittingly engaging with leg insert members 16. The engagement may be by snap-fit, a threaded coupling or similar well-known device. Two of the legs 14 terminate at lower extremities in a set of wheels and axle 18 while other two lower extremities of the legs 14 terminate in a set of elastomeric or plastic leg coverings 20 for engaging as do the set of wheels 18 with a supporting surface 22. The cooking system thus is capable of being labile or mobile by means of a proper application of the set of wheels and axle 18 when the other end thereof is raised to allow the legs 14 to pass over the surface of the supporting surface 22.

Within the cylindrical chamber 12 is a smoke or cooking chamber 26 and horizontally disposed about a lower portion thereof is a grill or cooking support surface 32. Access to the chamber 26 is available through a hingedly disposed smoke chamber door 34 seen supported by a set of hinges 36 along an upper element 38 of the door 34. Proximate a lower element 40 of the door 34 is a handle 42 and provided about a mediate portion of the door 34 is securably positioned a thermometer 46 responsive to indicating an accurate indication of heat within the chamber 26.

About an end of the chamber 26 and communicating directly therewith is a short pipe-shaped smoke stack 48 supportably disposed and firmly connected at a lower end by a circular insert member 56 to the cylindrical chamber 12 as shown, and a connected adjustable exhaust and flu cover 60 is supportably disposed and connected at an upper end of the stack 56 by protruding downward to a threaded horizontal female component inside the smoke stack, and lower than the top of the stack itself causing the vent cover to adjust the flow of exhaust smoke by moving up or down in a vertical plane.

About the other end of the chamber 26 and communicating directly therewith along a lower and mediate surface 70 is a detachable, hollow, generally square or rectangular fire box 72 supported onto the surface 70 by a set of carriage bolts 74. A forward surface of the fire box 72 is a fire box door 76 seen supported by hinges 78 along a vertical corner edge. Within a central portion of the fire box door 72 are at least two generally 2 inch (about 5 cm) adjustable controlled draft holes 80. About an upper surface 82 of the fire box 72 is a recessed braiser grate 84 over which is hingedly disposedly mounted a fire box cover 86 by hinges 88 along a horizontal corner edge and distally mounted on the fire box cover 86 is a heat proof handle 90. Not to be omited and mentioned is a heat proof handle member 92 for opening and closing the fire box door 76 and affixedly located on an opposite surface of the door 76 form its hinges 78 as shown.

Beneath the smoke chamber door 34 is a set of projections or snap-connected or ball and detent engaging rod members 94 that interface with the lower surface of the cylindrical chamber 12 and their length is sufficient in length to find support of a detachably disposed cutting table surface 96. The rod members 94 are generally securably affixed to the table surface 96 but are selectably removable from the cylindrical chamber 12.

It is within the purview of the present invention that the detachable fire box 72 may be separately functionly used as fire box and grill unit, such as at the beach, picnics, the mountains and the like, where it is found convenient for individual use since it is easily removed from the system 10 and taken along separately for such use. When thereafter desirable the fire box is reunited to the system 10 as described above.

The improved combination smoker, barbecue and brazier cooking system of the invention includes the combination grilling and smoking chamber 12 with a user attached combination indirect heat and smoke source or fire box 72 for the chamber 12. The user attached heat source consists of a cold rolled heavy steel shaped rectangularly and having a covered top lying at rest in a horizontal plane that opens in a vertical arc over a recessed expanded metal brazier grill. When not being used for brazing the hinged top closes to act as a warming plate and forms a closed separate fire box 72 containing a rectangular solid fuel support rack having a plurality of crosswires running the length of the fire box 72 and set on a centerline with support wires at each corner. The vertical door of the fire box has adjustable covered air vents that serve as an inlet draft source for the entire cooking system. The rear of the fire box is open and flanged on three sides. The horizontal or top flange is perforated with openings to accept fasteners for the mounting to the smoking and grilling chamber. The two vertical flanges are perforated with openings provided for the same purpose.

The cylindrical chamber has an opening on one end and having approximately the same size as the fire box opening and with matching perforations to allow the fire box to be user mounted. The rear opening of the fire box, when attached to the chamber allows an indirect, controllable heat and smoke source to flow through the chamber to exit via the detachable and adjustable exhaust stack mounted on the top end of the smoke chamber opposite the fire box.

The cooking chamber is constructed of cold rolled steel and is shaped in the form of a cylinder. This cylinder provides a vehicle that permits the attachment of the welded or otherwise attached support inserts to facilitate the attachment of the lower leg, wheel and wood rack assembly as well as the detachable table. The chamber has a threaded insert at the top opposite the fire box to cause the easy insertion of the smoke stack by the user as well as cause the smoke stack to be separate from the chamber having the effect of decreasing the cubic inch requirements and so to containerize the complete unit.

The smoke stack consists of a round metal shaped member being threaded on the lower end for easy insertion into the top of the chamber itself. The rectangular smoke stack cover has a threaded stem protruding downwardly to a threaded horizontal female componnent inside the smoke stack, and positioned lower than the top of the stack itserf causing the vent cover to adjust the flow of exhaust smoke by moving up or down in a vertical plane.

The smoke chamber opening is hinged and has a temperature indicator mounted in the door itself and at a point centered below the opening. The inside of the chamber contains a rectangular, removable solid fuel support rack made of a plurality of heavy gauge corsswires running the length of the chamber and extending approximately one third of the width of the chamber. This fuel rack is supported at the edges and sides by the inner arc of the chamber itself. Directly above the fuel support rack are two food support racks rectangular in shape and made of a plurality of wires running the length of the chamber and are approximately as wide as the diameter of the chamber itself causing the racks to be supported at their edges and sides by the inner arc formed by the chamber.

In operation of the device of the invention food to be cooked is placed on a rack inside the chamber. It may then be cooked by means of a direct heat source directly under the food or indirectly by using the separate fire box as an indirect source of heat for slower cooking with lower temperatures. The top cover of the fire box opens to expose a recessed expanded metal cooking or brazing surface if the user desires a smaller and more economical direct heat source for smaller portion requirements.

The apparatus of the country cooker cooking system 10 of the invention may be so constructed and arranged in its component parts that it is assembled as a kit or in kit form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Leters Patent is:

1. A country cooker cooking system including a combination brazier, barbecue, grilling and smoking arrangement for the preparation of certain foods comprising a cylindrical hollow body constructed throughout of a 16 gauge cold rolled steel or similar metal defining a cylindrical chamber stably supported by a set of four detachable legs having upper ends thereof interfittingly engaging with leg insert members, two of the legs terminate at lower extremities in a set of wheels and axle while other two lower extremities of the legs terminate in a set of elastomeric or plastic leg coverings for engaging as do the set of wheels with a supporting surface, the cylindrical chamber defining a smoke or cooking chamber in which horizontally disposed about a lower portion therein is a grill or cooking support surface, means providing access to the chamber through a hingedly disposed smoke chamber door supported by a set of hinges along an upper element of the door, handle means proximate a lower element of the door, a thermometer mounted about a mediate portion of the door and responsive to indicating an accurate indication of heat within the chamber, a short pipe-shaped smoke stack supportably disposed to and communicating directly with the chamber at its lower end by a circular insert member to the cylindrical chamber, a member connecting an adjustable exhaust and flu cover supportably disposed and connected at an upper end of the stack, a detachable, hollow fire box constructed of a 14 gauge cold rolled steel of similar metal and mounted about the other end of the chamber and communicating directly therewith along a lower and mediate surface by a set of carriage bolts, a forward surface of the fire box having fire box door supported by hinges along a vertical corner edge, adjustably controlled draft holes mounted in the door of the fire box, a recessed braiser grate mounted on an upper surface of the fire box over which is hingedly disposedly mounted by hinges a fire box cover along a horizontal corner edge, a handle mounted on the fire box cover, and set of projections or snap-connected or ball and detent engaging rod members mounted beneath the chamber door that interface with the lower surface of the cylindrical chamber and their length is sufficient in length to find support of a detachably disposed cutter table surface, the country cooker cooking system being so constructed and arranged in its component parts that it is assembled as a kit or in kit form.

2. The invention of claim 1 wherein the fire box is separately functional as a grill means when used apart of the system.

* * * * *